(12) United States Patent
Otomo et al.

(10) Patent No.: US 9,013,847 B2
(45) Date of Patent: Apr. 21, 2015

(54) PROTECTION RELAY APPARATUS

(71) Applicant: Kabushiki Kaisha Toshiba, Minato-ku (JP)

(72) Inventors: Yu Otomo, Higashimurayama (JP); Hirofumi Ohno, Tokorozawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 13/740,792

(22) Filed: Jan. 14, 2013

(65) Prior Publication Data

US 2013/0128402 A1    May 23, 2013

Related U.S. Application Data

(63) Continuation of application No. PCT/JP2011/052395, filed on Feb. 4, 2011.

(30) Foreign Application Priority Data

Jul. 15, 2010    (JP) .................................. 2010-160960

(51) Int. Cl.
*H02H 3/00*    (2006.01)
*H01H 83/00*    (2006.01)
*H02H 3/06*    (2006.01)
(Continued)

(52) U.S. Cl.
CPC ............... *H01H 83/00* (2013.01); *H02H 3/066* (2013.01); *H02H 7/22* (2013.01)

(58) Field of Classification Search
CPC .......... H02H 3/066; H02H 7/22; H01H 83/00
USPC .......................................................... 361/59
See application file for complete search history.

(56) References Cited

U.S. PATENT DOCUMENTS 7,317,599 B2 *    1/2008    Khoroshev et al. ............. 361/42
2004/0027747 A1    2/2004    Kim et al.
(Continued)

FOREIGN PATENT DOCUMENTS

CA    2737689 A1 *    3/2010
JP    5-168139    7/1993
(Continued)

OTHER PUBLICATIONS

International Search Report mailed May 10, 2011 in PCT/JP2011/052395 filed Feb. 4, 2011 (with English Translation).
International Written Opinion mailed May 10, 2011 in PCT/JP2011/052395 filed Feb. 4, 2011.
International Preliminary Report on Patentability issued Feb. 21, 2013 in PCT/JP2011/052395 filed Feb. 4, 2011.
(Continued)

*Primary Examiner* — Thienvu Tran
*Assistant Examiner* — Lucy Thomas
(74) *Attorney, Agent, or Firm* — Oblon, McClelland, Maier & Neustadt, L.L.P.

(57) ABSTRACT

According to one embodiment, there is provided a protection relay apparatus that protects lines of a three-phase alternating current power system, the protection relay apparatus including a fault detector to detect a fault of the line, an opening unit to open a circuit breaker of a fault phase in which the fault has occurred through detection of the fault, a fault phase voltage measurement unit to measure a voltage of the fault phase after the circuit breaker is opened, a fault recovery determination unit to determine whether the fault is recovered or not based on the voltage, and a closing unit to close the circuit breaker when the fault recovery determination unit determines that the fault is recovered.

5 Claims, 11 Drawing Sheets

(51) Int. Cl.
  *H02H 7/22*   (2006.01)
  *H02H 7/00*   (2006.01)

(56) References Cited

U.S. PATENT DOCUMENTS

| | | |
|---|---|---|
| 2005/0195538 A1 | 9/2005 | Khoroshev et al. |
| 2011/0170220 A1 | 7/2011 | Iinuma et al. |

FOREIGN PATENT DOCUMENTS

| | | |
|---|---|---|
| JP | 2004-64957 | 2/2004 |
| JP | 2001-103655 | 4/2011 |
| WO | WO 2010/032682 A1 | 3/2010 |

OTHER PUBLICATIONS

Written Opinion issued May 10, 2011 in PCT/JP2011/052395 filed Feb. 4, 2011 submitting English language translation only.

Office Action mailed Apr. 30, 2014, in Chinese Patent Application No. 201180023570.7, with English translation.

International Search Report issued Oct. 29, 2014, in European Application No. 11806503.6.

Xiangning Lin et al. "An Intelligent Adaptive Reclosure Scheme for High Voltage Transmission Lines", Intelligent Systems and Applications to Power Systems, Nov. 1, 2007, pp. 1-6.

Keizo Nakayama, 4 reclosing equipment, Hogokeidenshisutemu, basic issue, japan, Denkishoin, 1974, p. 137-140.

\* cited by examiner

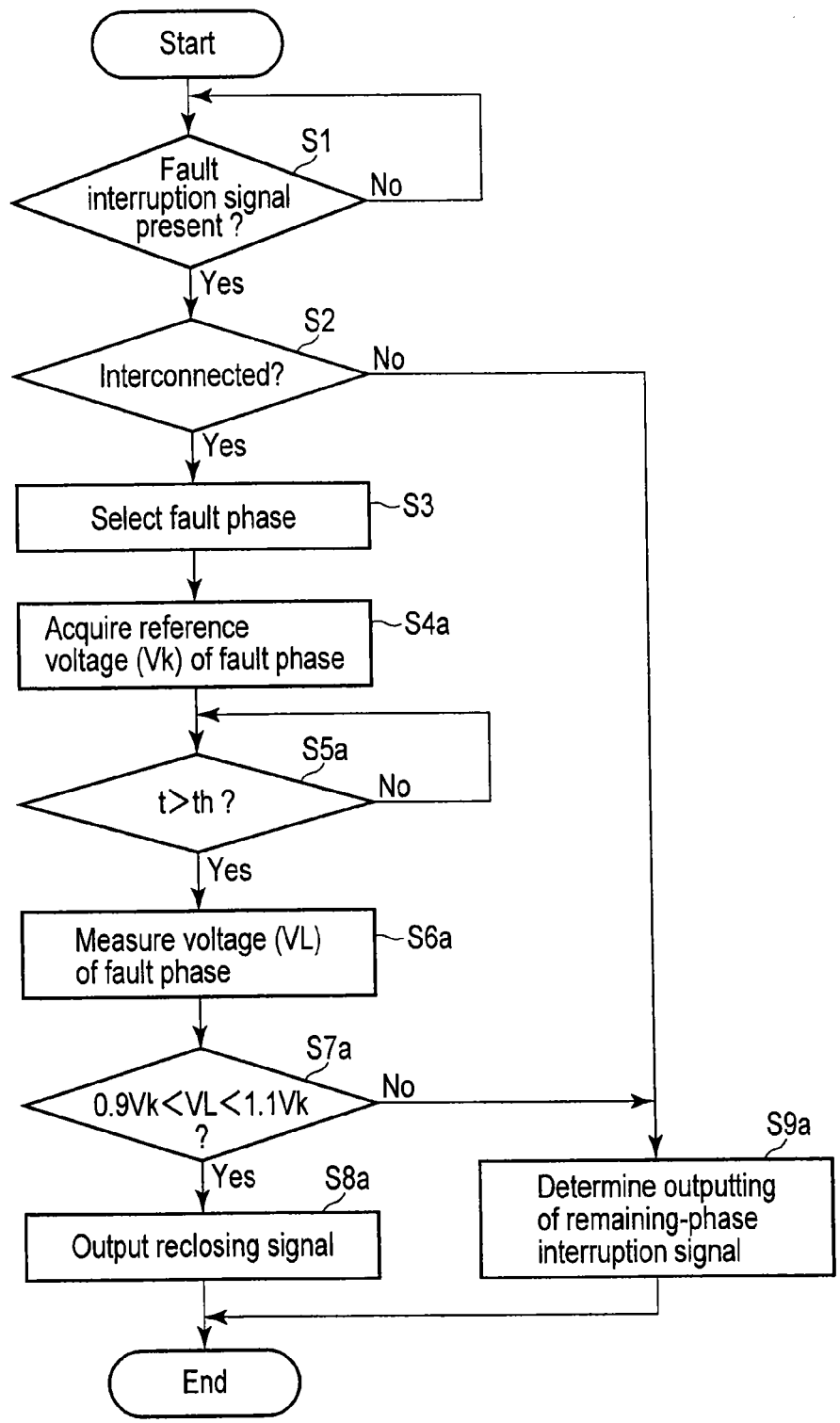
F I G. 6

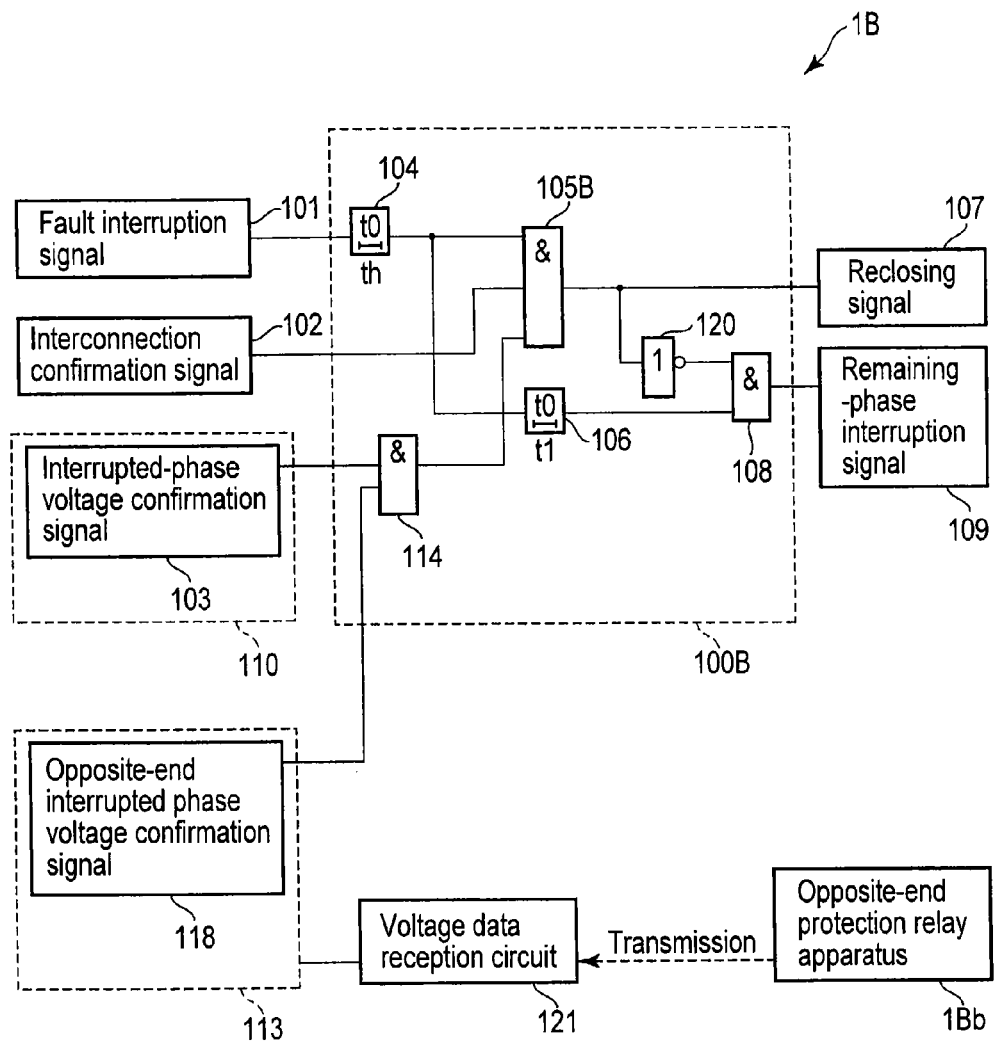
F I G. 1 1

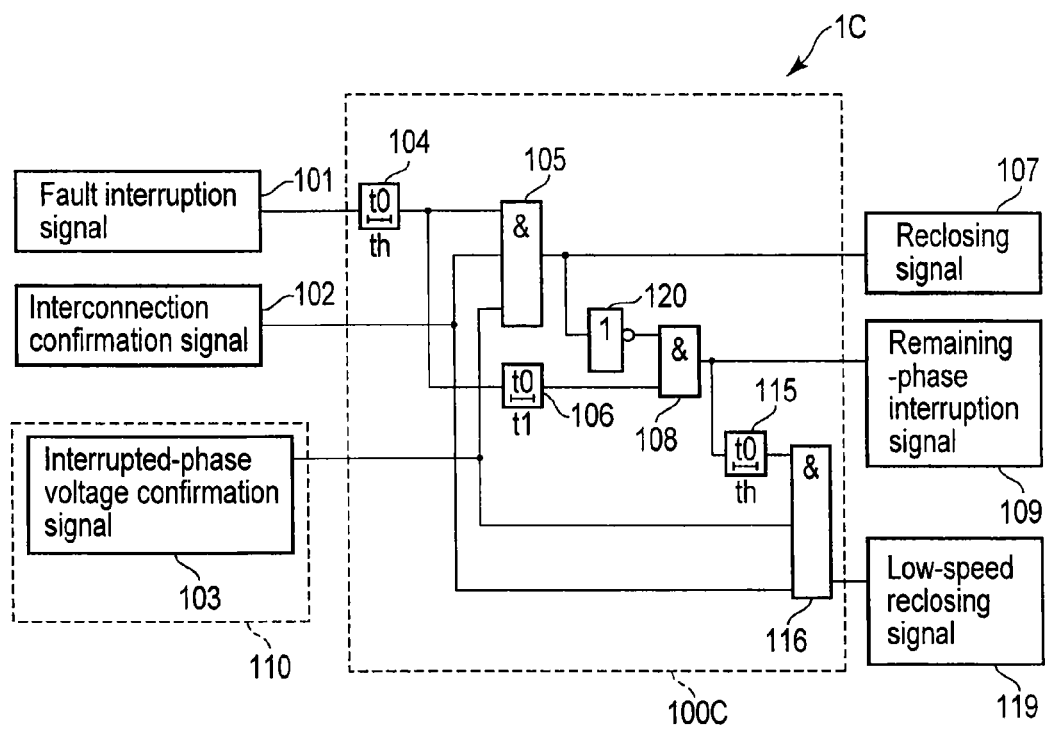
F I G. 1 3

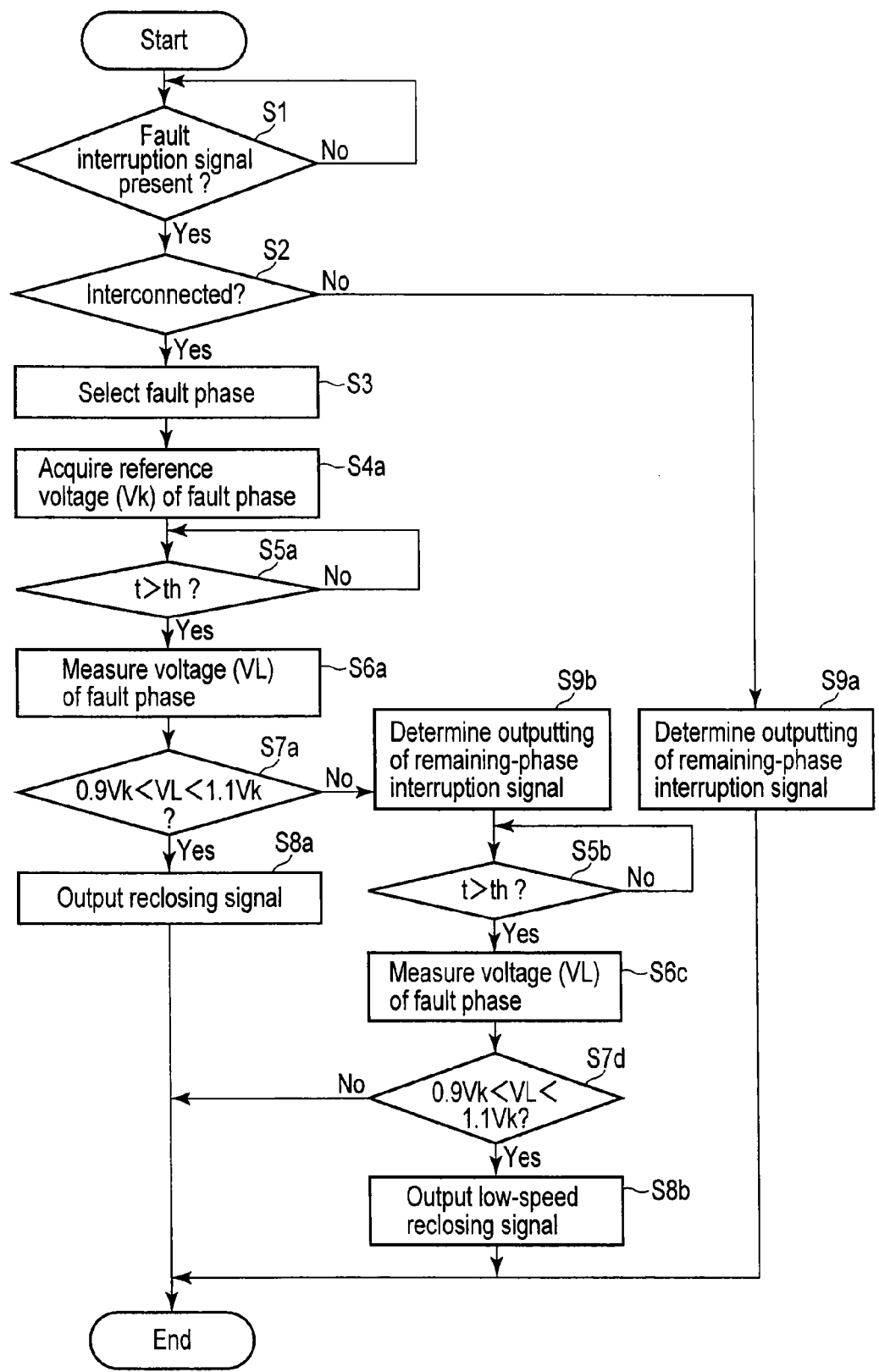
F I G. 14

PROTECTION RELAY APPARATUS

CROSS REFERENCE TO RELATED APPLICATIONS

This application is a Continuation application of PCT Application No. PCT/JP2011/052395, filed Feb. 4, 2011 and based upon and claiming the benefit of priority from Japanese Patent Application No. 2010-160960, filed Jul. 15, 2010, the entire contents of all of which are incorporated herein by reference.

FIELD

Embodiments described herein relate generally to a protection relay apparatus including a reclosing function.

BACKGROUND

Conventionally, a two-terminal power system to which a protection relay apparatus 10 shown in FIG. 15, for example, is applied is known. Currents detected by current transformers (instrument current transformers) 2 and a signal indicating the opened or closed state of the contacts of a circuit breaker 4 are input to the protection relay apparatus 10. The protection relay apparatus 10 detects a fault based on currents detected by the current transformers. When detecting a fault, the protection relay apparatus 10 outputs an interruption signal to the circuit breaker 4 to open the contacts of the circuit breaker 4. By opening the circuit breaker 4, the fault current is interrupted. Closing the circuit breaker 4 (that is, closing) again after the circuit breaker 4 was tripped is called reclosing the circuit breaker 4 or reclosing. It is possible to reduce power failure time by reclosing after tripping the circuit breaker 4.

The reclosing has various systems depending on the number of lines and the condition of a fault. For example, a single-phase reclosing system in which the circuit breaker of only a fault phase is opened and reclosed in the case of a fault (single-phase fault) that occurs in one phase of three phases, a three-phase reclosing system in which the three phases are reclosed after they are interrupted in the case of a fault in two or more phases and the like are known. Further, in a power transmission line system including two parallel lines, a multi-phase reclosing system for selecting only a fault phase and reclosing the circuit breaker at high speed in a condition that sound phases of two or more phases in which no fault occurs are present and the parallel lines are interconnected after a fault phase was interrupted is known.

A time from the fault interruption time until the circuit breaker is reclosed is called a reclosing no-voltage time. Generally, the reclosing no-voltage time is set to approximately one second in the single-phase reclosing system and multi-phase reclosing system and is set to approximately two seconds in the three-phase reclosing system.

Next, the time chart indicating the correlation of operation timings of the protection relay apparatus 10 and the circuit breaker 4a from occurrence of a fault to closing of the circuit breaker 4a is shown in FIG. 16. The protection relay apparatus 10 of the power transmission line outputs an opening instruction to the circuit breaker 4a at the time of occurrence of a fault. As a result, the circuit breaker 4a is opened. However, an arc occurs between the contacts of the circuit breaker 4a immediately after being opened. While an arc is being generated, a fault current continues to flow in the circuit breaker 4a. In the case of an alternating current system, the arc between the contacts extinguishes when the current becomes zero. As a result, interruption of the fault current is completed.

In a system fault, a secondary arc at the fault point extinguishes after interruption of the fault current is completed and the circuit breaker is reclosed after waiting for arc ions to be eliminated. The time (de-ionization time) until the arc ions are eliminated depends on an arc current, system voltage, line extending length, wind speed at the fault point and the like. Therefore, the reclosing no-voltage time is set longer than the de-ionization time.

However, in the case of a permanent fault due to the contact of trees or open circuit or the like, a fault occurs again even if the circuit breaker is reclosed after an elapse of the set reclosing no-voltage time. Thus, reclosing the circuit breaker while a fault lasts damages a part of the system (circuit breaker, transformer or power transmission line) and further influences the stability of the power system.

BRIEF DESCRIPTION OF THE DRAWINGS

FIG. 6 is a flowchart showing the protection operation of the protection relay apparatus according to the first embodiment.

FIG. 11 is a circuit diagram showing the sequence of a protection operation of the protection relay apparatus according to the third embodiment.

FIG. 13 is a circuit diagram showing the sequence of a protection operation of a protection relay apparatus according to a fourth embodiment.

FIG. 14 is a flowchart showing the protection operation of the protection relay apparatus according to the fourth embodiment.

DETAILED DESCRIPTION

Embodiments of the invention are explained below with reference to the drawings.

(First Embodiment)

Figure 1:
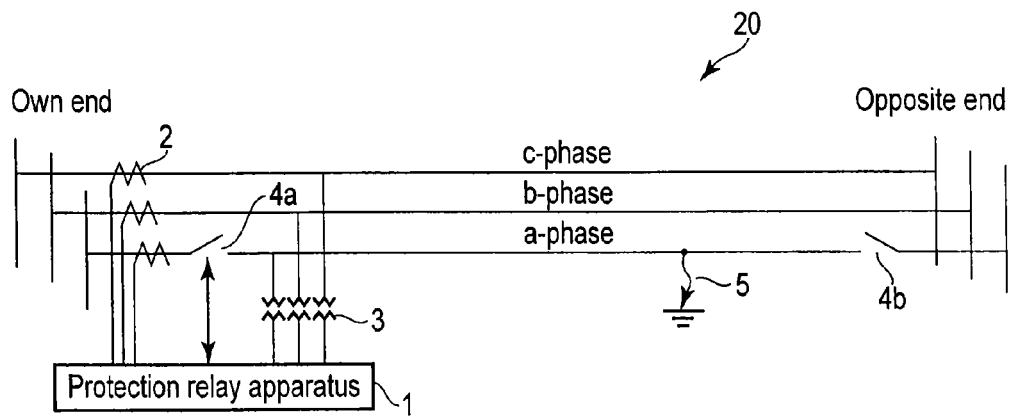
FIG. 1 is a configuration diagram of a two-terminal power system in which a protection relay apparatus according to a first embodiment of the invention is provided.

FIG. 1 is a configuration diagram of a power system 20 in which a protection relay apparatus 1 according to a first embodiment of the invention is provided. In this case, the same symbols are attached to the same portions in the respective drawings and the detailed explanation thereof is omitted and different portions are mainly described. The same applies to the following embodiments and the repetitive explanation is omitted.

The power system 20 is a three-phase alternating current two-terminal power system. In the power system 20, the current transformers 2 and voltage transformers (instrument voltage transformers) 3 are respectively provided in the respective phases. On its own end side of the power system 20, the circuit breaker 4a is provided in each phase. On the opposite end side of the power system 20, the circuit breaker 4b is provided in each phase.

A current detected by the current transformer 2 of each phase and voltage VL detected by the voltage transformer 3 of each phase are input to the protection relay apparatus 1. The protection relay apparatus 1 detects a fault based on the input current and voltage VL of each phase. When detecting a fault, the protection relay apparatus 1 opens the circuit breaker 4a to interrupt a fault section in which the fault is detected. As a result, the power transmission line of the power system 20 is protected. Further, the circuit breaker 4b on the opposite end side is opened by a different protection relay apparatus provided on the opposite end side.

Figure 2:
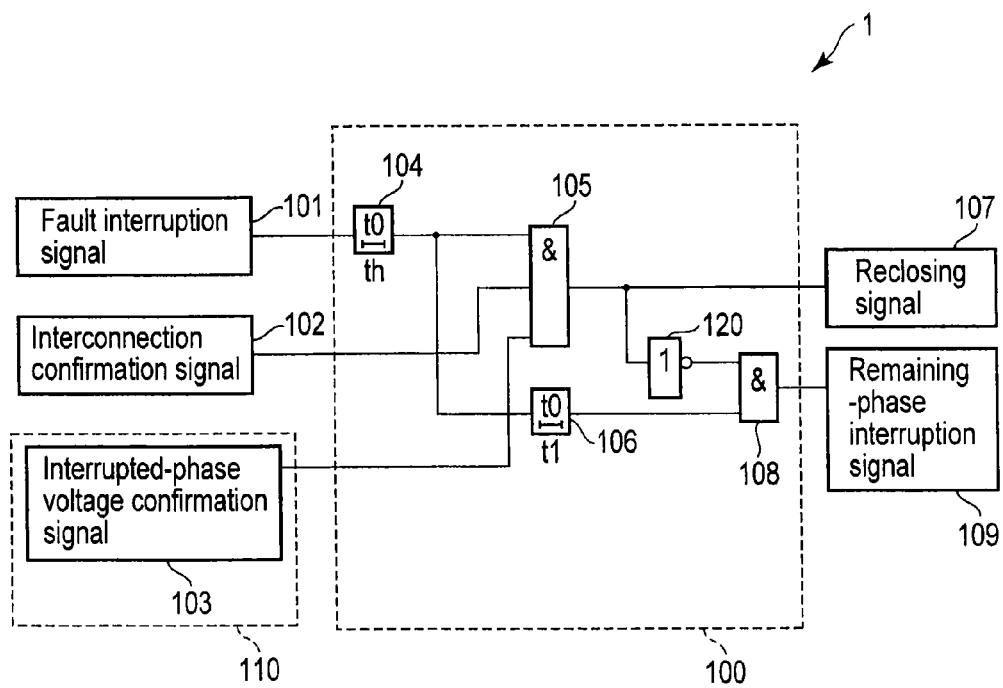
FIG. 2 is a circuit diagram showing the sequence of a protection operation of the protection relay apparatus according to the first embodiment.

FIG. 2 is a circuit diagram showing the sequence of a protection operation of the protection relay apparatus 1 according to the first embodiment.

The protection relay apparatus 1 includes a reclosing circuit 100 and interrupted-phase voltage determination unit 110.

The reclosing circuit 100 outputs a reclosing signal 107 and a remaining-phase interruption signal 109 based on a fault interruption signal 101, an interconnection confirmation signal 102 and an interrupted-phase voltage confirmation signal 103.

The fault interruption signal 101 is a signal for outputting an instruction that opens the circuit breaker 4a when the protection relay apparatus 1 detects a fault.

The interconnection confirmation signal 102 is a signal indicating that the interconnection is established (the power system on its own end side and the power system on the opposite end side are connected). The interconnection confirmation signal 102 is output when phases (sound phases) of two or more phases in which no fault occurred are present in the power transmission line after fault interruption (after opening of circuit breakers 4a, 4b).

The interrupted-phase voltage confirmation signal 103 is a signal indicating that a voltage of the fault phase (interrupted phase) in which circuit breakers 4a, 4b are opened is within a permissible range. The interrupted-phase voltage determination unit 110 determines whether or not the voltage of the interrupted phase is within the permissible range based on voltage VL detected by the voltage transformer 3. When determining that the voltage of the interrupted phase is within the permissible range, the interrupted-phase voltage determination unit 110 outputs the interrupted-phase voltage confirmation signal 103.

The reclosing signal 107 is a signal for issuing an instruction of reclosing after opening the circuit breaker 4a.

The remaining-phase interruption signal 109 is a signal for issuing an instruction of interrupting residual phases (remaining phases) in which the circuit breaker 4a is not opened.

The reclosing circuit 100 includes two timers 104, 106, two AND gates 105, 108 and a NOT gate 120.

The fault interruption signal 101 is input to the timer 104. No-voltage confirmation time th is set in the timer 104. The timer 104 outputs a signal to the AND gate 105 and timer 106 after an elapse of no-voltage confirmation time th from the time the fault interruption signal 101 was input.

A signal from the timer 104, the interconnection confirmation signal 102 and the interrupted-phase voltage confirmation signal 103 are input to the AND gate 105. The AND gate 105 outputs a signal to the NOT gate 120 and outputs the reclosing signal 107 if all of the signal from the timer 104, the interconnection confirmation signal 102 and the interrupted-phase voltage confirmation signal 103 are input (if the AND condition is satisfied).

A signal from the timer 104 is input to the timer 106. Reclosing abandonment time t1 for abandoning reclosing is set in the timer 106. The timer 106 outputs a signal to the AND gate 108 after an elapse of reclosing abandonment time t1 from the time the signal from the timer 104 was input.

A signal from the AND gate 105 is input to the NOT gate 120. The NOT gate 120 outputs a signal to the AND gate 108 while a signal is not input from the AND gate 105. The NOT gate 120 does not output a signal when a signal is input from the AND gate 105.

A signal from the timer 106 and a signal from the NOT gate 120 are input to the AND gate 108. The AND gate 108 outputs the remaining-phase interruption signal 109 when signals are input from both of the timer 106 and NOT gate 120.

Next, a determination method of outputting the interrupted-phase voltage confirmation signal 103 in the interrupted-phase voltage determination unit 110 is explained.

The permissible range used for determination on the interrupted-phase voltage determination unit 110 is expressed by the following expression.

$$(1-k)Vk < VL < (1+k)Vk \quad (1)$$

where "k" expresses a permissible factor, "Vk" expresses a reference voltage and "VL" expresses a voltage detected by the voltage transformer 3.

Permissible factor k is determined by taking a measurement error, an error in an operation process or an error due to an instrument or the like into consideration. Permissible factor k is 10% (k=0.1), for example.

Reference voltage Vk is previously set in the interrupted-phase voltage determination unit 110. Reference voltage Vk is obtained by previously measuring a voltage at the opening time of circuit breakers 4a, 4b set in each phase with the voltage transformer 3 when no fault occurs (at the sound time). As reference voltage Vk used for determination at the fault time, reference voltage Vk of the same phase as the phase (fault phase) in which the fault is detected is used.

Voltage VL measured by the voltage transformer 3 at the opening time of circuit breakers 4a, 4b is explained.

Figure 3:
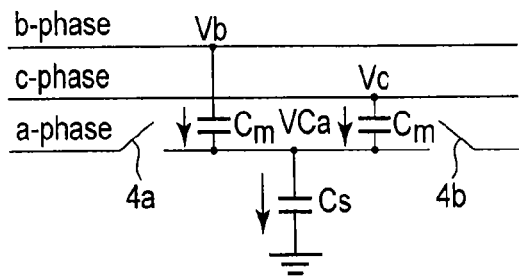
FIG. 3 is a configuration diagram of a power system indicating an electrostatic coupling voltage calculated by the protection relay apparatus according to the first embodiment.
Figure 4:
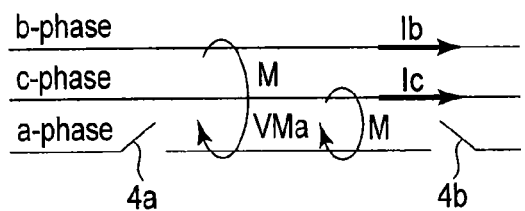
FIG. 4 is a configuration diagram of a power system indicating an electromagnetic coupling voltage calculated by the protection relay apparatus according to the first embodiment.

FIG. 3 is a configuration diagram of a power system indicating an electrostatic coupling voltage calculated by the protection relay apparatus 1. FIG. 4 is a configuration diagram of a power system indicating an electromagnetic coupling voltage calculated by the protection relay apparatus 1.

Voltage VL at the opening time of circuit breakers 4a, 4b is the sum of the electrostatic coupling voltage and electromagnetic coupling voltage. First, a case of a single-phase fault of a one-line power transmission line (in this case, a fault of the a-phase) is explained.

After a fault occurs in the a-phase and circuit breakers 4a, 4b of the a-phase are opened, a voltage (induced voltage) induced from the b-phase and c-phase that are sound phases occurs in the a-phase. The induced voltage is a voltage obtained by combining the electrostatic coupling voltage and electromagnetic coupling voltage.

FIG. 3 shows the electrostatic coupling relationship of the a-phase voltage. Where interphase electrostatic capacitances occurring between lines (between the a-phase and the b-phase and between the a-phase and the c-phase) due to the electrostatic coupling are "Cm" and electrostatic capacitance to ground is "Cs", "Vca" indicating the electrostatic coupling voltage of the a-phase is expressed as follows.

$$Vca=(Cm/(2Cm+Cs))\times(Vb+Vc) \quad (2)$$

FIG. 4 shows the electromagnetic coupling relationship of the a-phase.

If an angular frequency depending on the frequency of the power system 20 is "ω", mutual impedance occurring between lines due to the electromagnetic coupling is "M", a current passing through the b-phase is "Ib" and a current passing through the c-phase is "Ic", "VMa" indicating the electromagnetic coupling voltage of the a-phase is expressed by the following equation by use of "j" that is an imaginary unit.

$$VMa=j\omega M(Ib+Ic) \quad (3)$$

Therefore, the induced voltage of the a-phase of the state in which circuit breakers 4a, 4b of the a-phase are opened can be expressed by VCa+VMa as the sum of the electrostatic coupling voltage indicated by Equation (2) and the electromagnetic coupling voltage indicated by Equation (3). Since the induced voltage is an induced voltage occurring in the a-phase if the a-phase is a open-phase state, reference voltage Vk similarly is expressed.

The relationship between reference voltage Vk and a voltage (measured voltage) measured by the voltage transformer 3 immediately after completion of interruption of the fault phase due to the single-phase fault is explained with reference to FIG. 5.

The induced voltage immediately after completion of interruption of the fault phase is approximately 0. After this, if the fault of the power system 20 is restored, the induced voltage rises to approximately reference voltage Vk and becomes constant. Therefore, measured voltage VL varies similarly to the induced voltage.

Figure 5:
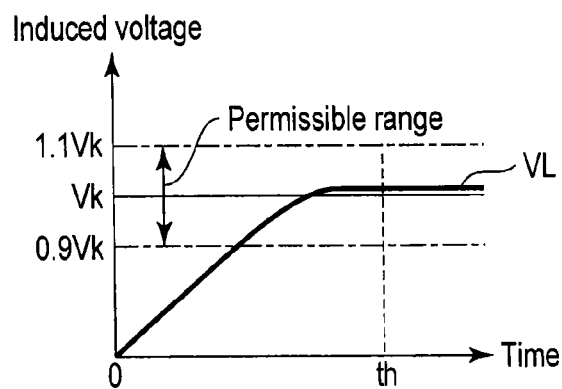
FIG. 5 is a graph diagram indicating a no-voltage confirmation time set in the protection relay apparatus according to the first embodiment.

No-voltage confirmation time th set in the timer 104 is set to a time that is longer than a time to a time point at which it is predicted that measured voltage VL becomes constant in a portion near reference voltage Vk immediately after completion of interruption of the fault phase (the 0 point in FIG. 5).

FIG. 6 is a flowchart indicating the procedure of the protection operation of the protection relay apparatus 1 according to the first embodiment. In this case, an example of a case wherein permissible factor k is set to 10% (k=0.1) is shown.

The reclosing circuit 100 determines whether the fault interruption signal 101 is input or not (step S1). The reclosing circuit 100 continuously makes the above determination (No in step S1) until the fault interruption signal 101 is input.

When determining that the fault interruption signal 101 is input (Yes in step S1), the reclosing circuit 100 determines whether it is interconnected or not (whether the interconnection confirmation signal 102 is input or not) as one of reclosing conditions (step S2). If the reclosing circuit 100 determines that it is not interconnected (No in step S2), it determines whether or not the remaining-phase interruption signal 109 is to be output (step S9a).

If determining that it is interconnected (Yes in step S2), the interrupted-phase voltage determination unit 110 selects a fault phase (step S3). The interrupted-phase voltage determination unit 110 acquires reference voltage Vk of the selected fault phase (step S4). After this, the interrupted-phase voltage determination unit 110 determines whether or not time t after the fault interruption signal 101 was input (or the time after the circuit breaker 4a provided on its own end was opened) has exceeded no-voltage confirmation time th (step S5a). The interrupted-phase voltage determination unit 110 waits until time t exceeds no-voltage confirmation time th (No in step S5a).

The interrupted-phase voltage determination unit 110 measures voltage VL of the fault phase after time t has exceeded no-voltage confirmation time th (step S6a). The interrupted-phase voltage determination unit 110 determines whether or not measured voltage VL of the fault phase is within the previously set permissible range (0.9Vk<VL<1.1Vk) (step S7a).

When determining that measured voltage VL of the fault phase is not within the permissible range (No in step S7a), the reclosing circuit 100 determines whether or not the remaining-phase interruption signal 109 is to be output (step S9a). When determining that measured voltage VL of the fault phase is within the permissible range (Yes in step S7a), the reclosing circuit 100 outputs the reclosing signal 107 (step S8a).

Next, the operation of the protection relay apparatus 1 is explained by using a concrete example. First, the operation in a case wherein a fault of an arc that extinguishes within no-voltage confirmation time th occurs in one phase and sound phases of two or more phases in which no fault occurs are left and are interconnected is explained.

If an arc fault occurs in one phase, the fault interruption signal 101 is input to the reclosing circuit 100. Therefore, the reclosing circuit 100 determines that the fault interruption signal 101 is input (Yes in step S1).

Since sound phases of two or more phases are left, the interconnection confirmation signal 102 indicating that they are interconnected is input to the reclosing circuit 100. Therefore, the reclosing circuit 100 determines that the interconnection confirmation signal 102 is input (Yes in step S2).

The interrupted-phase voltage determination unit 110 selects a phase in which a fault has occurred (step S3). The interrupted-phase voltage determination unit 110 acquires reference voltage Vk at the sound time when circuit breakers 4a, 4b of the selected phase are opened (step S4a). The interrupted-phase voltage determination unit 110 acquires measured voltage VL of the fault phase by the voltage transformer 3 (step S6a) after an elapse of no-voltage confirmation time th from the time the fault interruption signal 101 was input (Yes in step S5a). The interrupted-phase voltage determination unit 110 determines whether or not acquired measured voltage VL is within the previously set permissible range (step S7a).

The arc fault extinguishes within no-voltage confirmation time th based on a precondition. Therefore, since the fault phase in which the arc fault occurred is recovered from the fault, measured voltage VL of the fault phase measured after an elapse of no-voltage confirmation time th is returned to the range previously set before the arc fault occurred. As a result, the interrupted-phase voltage determination unit 110 determines that measured voltage VL is within the previously set range (Yes in step S7a). Therefore, the interrupted-phase voltage determination unit 110 outputs the interrupted-phase voltage confirmation signal 103 to the reclosing circuit 100.

The reclosing circuit 100 outputs the reclosing signal 107 to the circuit breaker 4a provided in the fault phase (step S8a) since all of the conditions of inputting the fault interruption signal 101 (Yes in step S1), inputting the interconnection confirmation signal 102 (Yes in step S2) and inputting the interrupted-phase voltage confirmation signal 103 (Yes in step S7a) are satisfied. As a result, the circuit breaker 4a provided in the fault phase is reclosed.

Next, a case wherein a permanent fault occurs in one phase and sound phases of two or more phases are left and are interconnected is explained.

First, the reclosing circuit 100 determines that the fault interruption signal 101 is input (Yes in step S1). Further, the reclosing circuit 100 determines that the interconnection confirmation signal 102 is input (Yes in step S2).

The interrupted-phase voltage determination unit 110 selects a fault phase (step S3). The interrupted-phase voltage determination unit 110 acquires reference voltage Vk at the sound time when circuit breakers 4a, 4b of the selected phase are opened (step S4a). The interrupted-phase voltage determination unit 110 acquires measured voltage VL of the fault phase by the voltage transformer 3 (step S6a) after an elapse of no-voltage confirmation time th from the time the fault interruption signal 101 was input (Yes in step S5a). The interrupted-phase voltage determination unit 110 determines whether or not acquired measured voltage VL is within the previously set permissible range (step S7a).

Since it is the permanent fault based on the precondition, the fault lasts even if after no-voltage confirmation time th has elapsed. Therefore, measured voltage VL of the fault phase measured after an elapse of no-voltage confirmation time th is not returned to reference voltage Vk before the fault occurred. As a result, measured voltage VL is not within the permissible range. Therefore, the interrupted-phase voltage determination unit 110 determines that measured voltage VL is not within the previously set range (No in step S7a). The interrupted-phase voltage determination unit 110 does not output the interrupted-phase voltage confirmation signal 103 to the reclosing circuit 100.

The input of the fault interruption signal 101 (Yes in step S1) and the input of the interconnection confirmation signal 102 (Yes in step S2) are provided for the reclosing circuit 100, but the interrupted-phase voltage confirmation signal 103 is not input (No in step S7a). Therefore, the reclosing circuit 100 does not output the reclosing signal 107. Further, owing to the permanent fault, the reclosing circuit 100 finally outputs the remaining-phase interruption signal 109 to circuit breakers 4a provided in the phases other than the fault phase (step S9a). As a result, circuit breakers 4a provided in the phases other than the fault phase are also opened.

Next, a case wherein sound phases of two or more phases are not left (that is, they are not interconnected) irrespective of the type of fault such as an arc fault or permanent fault is explained.

First, the reclosing circuit 100 determines that a fault interruption signal is input in fault interruption signal determination step S1 (Yes in step S1). Then, the reclosing circuit 100 determines that interconnection confirmation signal is not input based on the precondition (No in step S2). Therefore, the reclosing circuit 100 does not output the reclosing signal 107. If the interconnection is not be attained as it is, the reclosing circuit 100 finally outputs the remaining-phase interruption signal 109 to circuit breakers 4a provided in the phases other than the fault phase (step S9a). As a result, circuit breakers 4a provided in the phases other than the fault phase are also opened.

According to this embodiment, the protection relay apparatus 1 determines whether the fault lasts or not before the circuit breaker 4a is reclosed after an elapse of no-voltage confirmation time th from the time circuit breakers 4a, 4b were opened due to occurrence of the fault. Therefore, the protection relay apparatus 1 is capable of suppressing the circuit breaker from being reclosed while the fault lasts. Further, the protection relay apparatus 1 is capable of enhancing the stability of the power system or reduce damages to the system instruments or the like.

(Second Embodiment)

Figure 7:
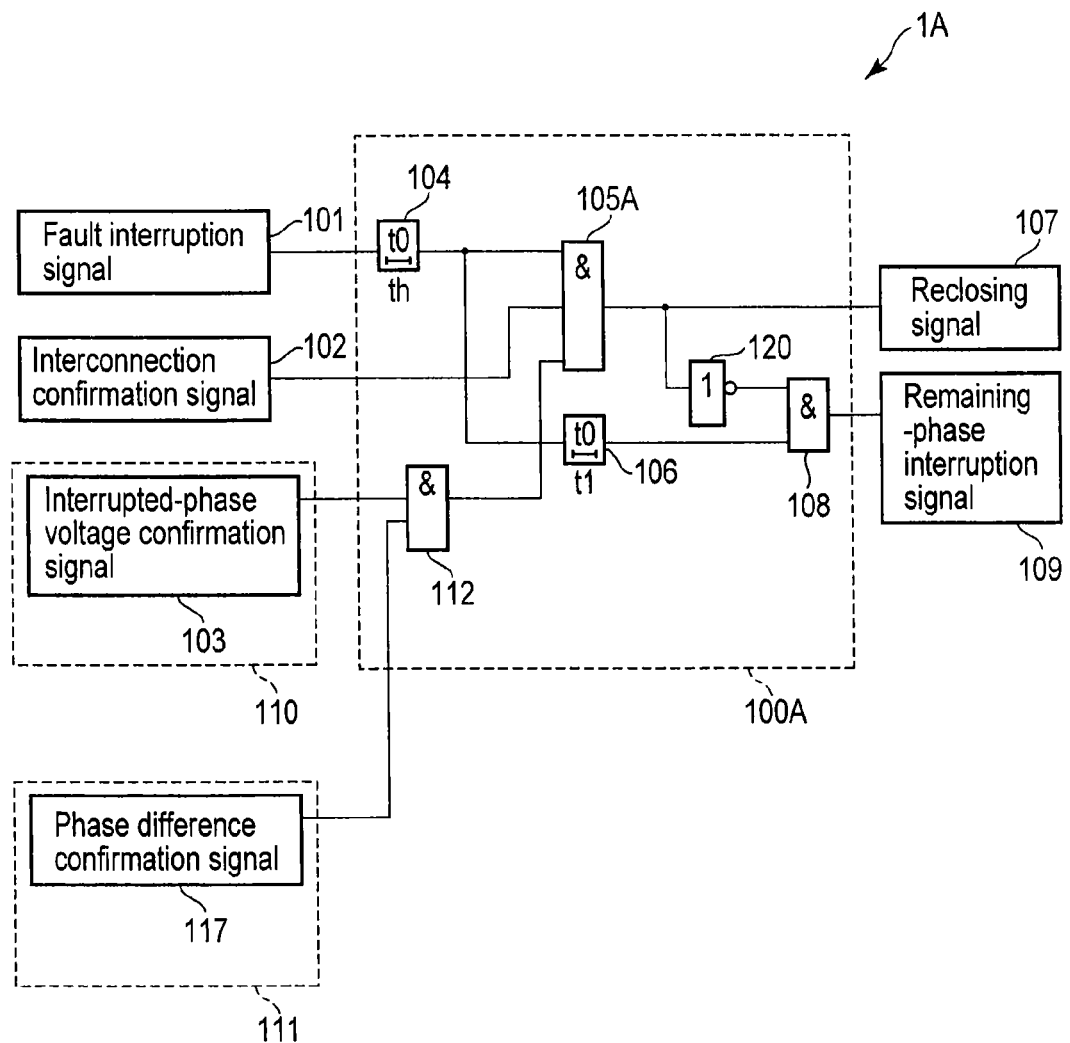
FIG. 7 is a circuit diagram showing the sequence of a protection operation of a protection relay apparatus according to a second embodiment of the invention.

FIG. 7 is a circuit diagram showing the sequence of a protection operation of a protection relay apparatus 1A according to a second embodiment of the invention.

A protection relay apparatus 1A has the configuration in which a phase difference determination unit 111 is additionally provided and the reclosing circuit 100 is replaced by a reclosing circuit 100A in the protection relay apparatus 1 according to the first embodiment shown in FIG. 2. The reclosing circuit 100A has the configuration in which the AND gate 105 is replaced by an AND gate 105A and an AND gate 112 is additionally provided in the reclosing circuit 100 according to the first embodiment. The other portions are the same as those of the protection relay apparatus 1 according to the first embodiment.

The phase difference determination unit 111 determines whether or not a phase difference between measured voltage VL measured by the voltage transformer 3 and reference voltage Vk previously measured by the voltage transformer 3 at the sound time when circuit breakers 4a, 4b are opened is within previously set permissible ranges. When determining that the phase difference is within the permissible range, the phase difference determination unit 111 outputs a phase difference confirmation signal 117 to the AND gate 112 of the reclosing circuit 100A. In this case, it is supposed that the phase of reference voltage Vk is obtained by continuously computing a phase of the power transmission line at the sound time from the time prior to occurrence of a fault with a timer contained in the protection relay apparatus 1A.

The interrupted-phase voltage confirmation signal 103 output from an interrupted-phase voltage determination unit 110 and the phase difference confirmation signal 117 output from the phase difference determination unit 111 are input to the AND gate 112. When both of the interrupted-phase voltage confirmation signal 103 and the phase difference confirmation signal 117 are input, the AND gate 112 outputs a signal to the AND gate 105A.

A signal from the AND gate 112 is input to the AND gate 105A instead of the interrupted-phase voltage confirmation signal 103 in the AND gate 105 according to the first embodiment. The other configuration is the same as the AND gate 105 according to the first embodiment.

Figure 8:
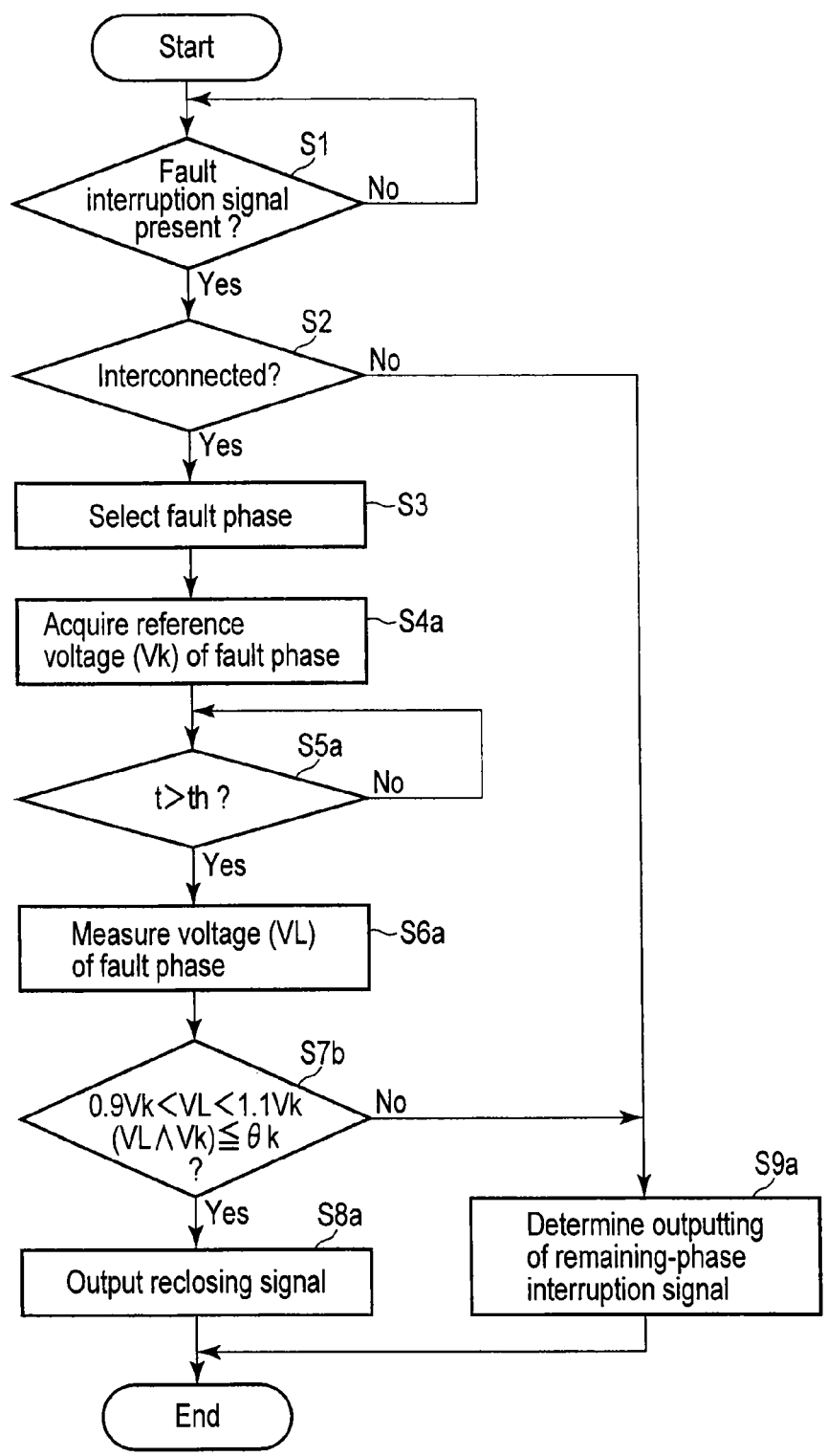
FIG. 8 is a flowchart showing the protection operation of the protection relay apparatus according to the second embodiment.

FIG. 8 is a flowchart showing the procedure of the protection operation of the protection relay apparatus 1A according to the second embodiment.

The flowchart showing the procedure of the protection operation of the protection relay apparatus 1A is obtained by replacing step S7a of determining an interrupted-phase voltage by step S7b in the flowchart according to the first embodiment. The other procedure is the same as that of the flowchart according to the first embodiment.

The procedure of the protection operation of the protection relay apparatus 1A is the same as the first embodiment from step S1 to step S6a. However, it is supposed that the phase difference determination unit 111 acquires data related to measured voltage VL and reference voltage Vk like the interrupted-phase voltage determination unit 110.

The phase difference determination unit 111 determines whether or not phase difference θ between measured voltage VL and reference voltage Vk is within the previously set permissible range in addition to whether or not measured voltage VL is within the previously set permissible range (0.9 Vk<VL<1.1 Vk) (step S7b). If phase difference θ is less than or equal to previously set phase difference θk, it is determined that phase difference θ is within the permissible range. The expression for determining the phase difference is (VL∧Vk) ≤θk. Where (VL∧Vk) is phase difference θ between measured voltage VL and reference voltage Vk.

When determining that measured voltage VL is within the permissible range, the interrupted-phase voltage determination unit 110 outputs the interrupted-phase voltage confirmation signal 103 to the AND gate 112 of the reclosing circuit 100A. Further, when determining that phase difference θ between measured voltage VL and reference voltage Vk is within the permissible range, the phase difference determination unit 111 outputs the phase difference confirmation signal 117 to the AND gate 112 of the reclosing circuit 100A.

At the time of step S7b, no-voltage confirmation time th has already elapsed from the time the fault interruption signal 101 was input (Yes in step S1 and Yes in step S5a) and the interconnection is attained (Yes in step S2). Therefore, when it is determined that measured voltage VL is within the permissible range and it is determined that phase difference θ between measured voltage VL and reference voltage Vk is within the permissible range, the reclosing circuit 100A outputs the reclosing signal 107 to the circuit breaker 4a provided in the fault phase (S8a). As a result, the circuit breaker 4a is reclosed.

On the other hand, when it is determined that measured voltage VL is not within the permissible range or it is determined that phase difference θ between measured voltage VL and reference voltage Vk is not within the permissible range, the reclosing circuit 100A does not output the reclosing signal 107 even if no-voltage confirmation time th has elapsed from the time the fault interruption signal 101 was input and the interconnection confirmation signal 102 was input. In this case, this is because the reclosing circuit 100A determines that the fault lasts. Therefore, the reclosing circuit 100A determines whether or not the remaining-phase interruption signal 109 is to be output (step S9a). If the reclosing condition is kept unsatisfied as it is, the reclosing circuit 100A finally outputs the remaining-phase interruption signal 109 to circuit breakers 4a provided in the remaining phases other than the fault phase. As a result, circuit breakers 4a provided in the remaining phases are also opened.

According to this embodiment, the following operation and effect can be attained in addition to the operation and effect of the first embodiment. Since the protection relay apparatus 1A determines whether the fault lasts or not also based on phase difference θ between measured voltage VL and reference voltage Vk, the reliability of the result of determination whether the fault lasts or not can be enhanced. As a result, the circuit breaker 4a can be further prevented from being reclosed while the fault lasts.

The configuration in which determination whether or not measured voltage VL is within the permissible range and determination whether or not phase difference θ between measured voltage VL and reference voltage Vk is within the permissible range are separately made by the interrupted-phase voltage determination unit 110 and phase difference determination unit 111, respectively, in step S7b is explained.

Next, the configuration in which the above determinations are simultaneously made in one portion is explained. In this case, the explanation is made on the assumption that the above determinations are made by the interrupted-phase voltage determination unit 110.

Figure 9:
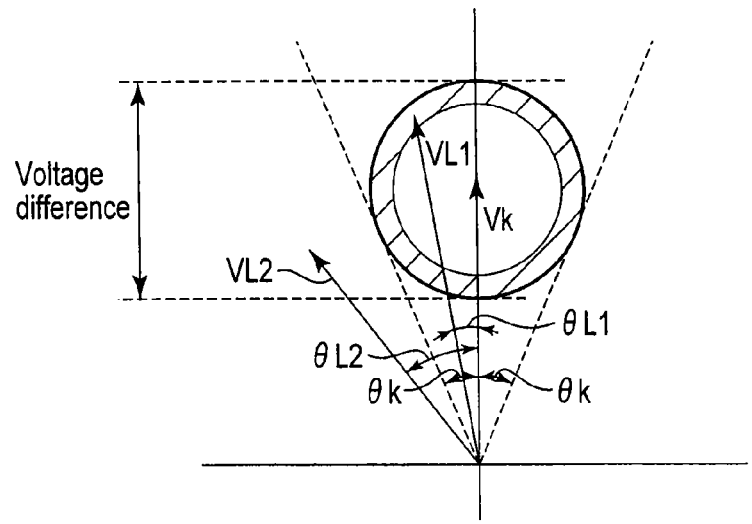
FIG. 9 is a characteristic diagram showing the characteristic for determining an interrupted-phase voltage on the protection relay apparatus according to the second embodiment.

FIG. 9 is a characteristic diagram showing the characteristic for determining an interrupted-phase voltage set in the interrupted-phase voltage determination unit 110. Reference voltage vector Vk expresses reference voltage Vk by use of a vector. Voltage vectors VL1, VL2 express voltages corresponding to measured voltage VL that will be explained below by use of a vector.

The lengths of voltage vectors Vk, VL1, VL2 shown in FIG. 9 indicate voltages and the directions of arrows indicate phases. Therefore, a difference in the length of given two voltage vectors expresses a voltage difference and an angle made between given two voltage vectors expresses a phase difference.

An oblique-line portion indicates a region in which both of the voltage difference and phase difference between measured voltage VL and reference voltage Vk are within the permissible ranges. If the front end of the voltage vector used as measured voltage VL is contained in the oblique-line portion, it is indicated that both of the voltage and phase of measured voltage VL are within the permissible ranges.

First, when measured voltage VL1 is viewed, the front end of the vector is contained in the oblique-line portion. As a result, it is determined that the voltage difference and phase difference θL1 in measured voltage VL1 are within the permissible ranges. Therefore, the interrupted-phase voltage determination unit 110 outputs signals corresponding to the interrupted-phase voltage confirmation signal 103 and the phase difference confirmation signal 117.

On the other hand, when measured voltage VL2 is viewed, it is not contained in the oblique-line portion. As a result, it is determined that at least one of the voltage difference and/or phase difference θL2 in measured voltage VL2 is not within the permissible range. In this case, if measured voltage VL2 is confirmed, the voltage difference is within the permissible range, but phase difference θL2 is larger than phase difference θk used as a reference. Therefore, since measured voltage VL2 is not within the permissible range, the interrupted-phase voltage determination unit 110 outputs no signal.

Thus, whether or not the voltage and phase of measured voltage VL are within the permissible ranges can be simultaneously determined by setting data such as the characteristic diagram shown in FIG. 9 in the reclosing circuit 100A.

(Third Embodiment)

Figure 10:
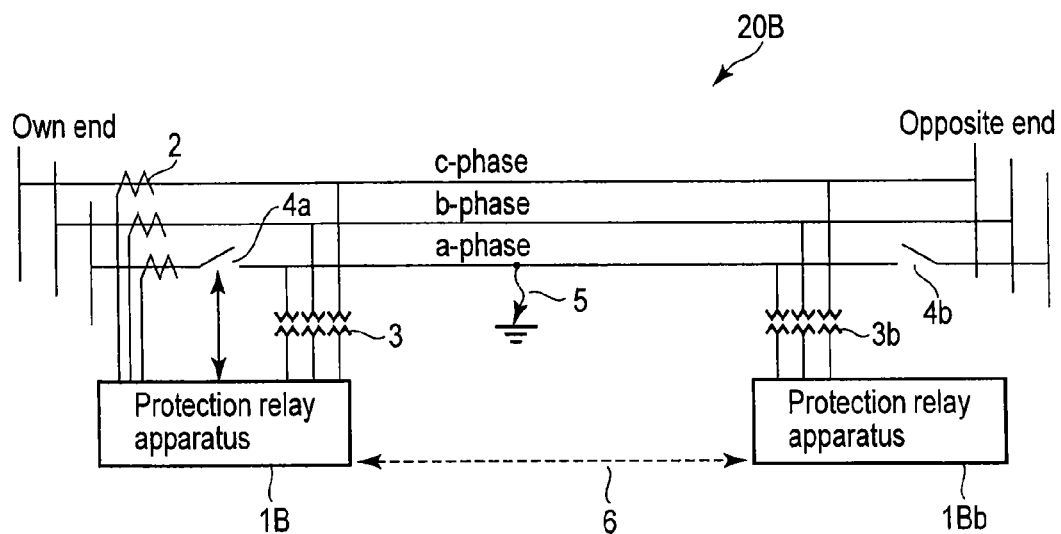
FIG. 10 is a configuration diagram of a two-terminal power system in which a protection relay apparatus according to a third embodiment of the invention is provided.

FIG. 10 is a configuration diagram of a power system 20B in which a protection relay apparatus 1B according to a third embodiment of the invention is provided.

The power system 20B is obtained by replacing the protection relay apparatus 1 by a protection relay apparatus 1B, setting a protection relay apparatus 1Bb on the opposite end side and providing voltage transformer 3b in each phase on the opposite end side in the power system 20 according to the first embodiment shown in FIG. 1. The other portions are the same as those of the power system 20 of the first embodiment.

Voltage transformers 3b are instruments equivalent to the voltage transformers 3 provided on its own end side. Voltage transformers 3b detect a voltage of each phase of a power transmission line of the power system 20B on the opposite end side.

The protection relay apparatus 1Bb is a apparatus equivalent to the protection relay apparatus 1B provided on its own end side. The protection relay apparatus 1Bb measures a voltage of each phase of the power transmission line of the power system 20B on the opposite end side based on voltages detected by voltage transformers 3b. The protection relay apparatus 1Bb transmits measured voltages VLb to the protection relay apparatus 1B via a transmission line.

FIG. 11 is a circuit diagram showing the sequence of a protection operation of the protection relay apparatus 1B according to the third embodiment.

The protection relay apparatus 1B has the configuration in which an opposite-end interrupted-phase voltage determination unit 113 and voltage data reception circuit 121 are additionally provided and the reclosing circuit 100A is replaced by a reclosing circuit 100B in the protection relay apparatus 1A according to the second embodiment shown in FIG. 7. The reclosing circuit 100B has the configuration in which the AND gate 105A is replaced by an AND gate 105B and the AND gate 112 is replaced by an AND gate 114 in the reclosing circuit 100A according to the second embodiment. The other portions are the as those of the protection relay apparatus 1A according to the second embodiment.

The voltage data reception circuit 121 receives measured voltages VLb obtained by measuring voltages detected by voltage transformers 3b from the protection relay apparatus 1Bb. The voltage data reception circuit 121 outputs received measured voltages VLb to the opposite-end interrupted-phase voltage determination unit 113.

The opposite-end interrupted-phase voltage determination unit 113 has the same configuration as the interrupted-phase voltage determination unit 110 except that measured voltage VLb of an interrupted phase on the opposite end side is determined. The opposite-end interrupted-phase voltage determination unit 113 determines whether or not measured voltage VLb of the interrupted phase on the opposite end side is within a permissible range based on reference voltage Vkb previously measured by voltage transformer 3b at the sound time when circuit breakers 4a, 4b are opened. When determining that measured voltage VLb is within the permissible range, the opposite-end interrupted-phase voltage determination unit 113 outputs an opposite-end interrupted-phase voltage confirmation signal 118 to the AND gate 114 of the reclosing circuit 100B.

The interrupted-phase voltage confirmation signal 103 output from the interrupted-phase voltage determination unit 110 and the opposite-end interrupted-phase voltage confirmation signal 118 output from the opposite-end interrupted-phase voltage determination unit 113 are input to the AND gate 114. When both of the interrupted-phase voltage confirmation signal 103 and the opposite-end interrupted-phase voltage confirmation signal 118 are input, the AND gate 114 outputs a signal to the AND gate 105B.

A signal from the AND gate 114 is input to the AND gate 105B instead of the interrupted-phase voltage confirmation signal 103 in the AND gate 105 according to the first embodiment. The other configuration is the same as the AND gate 105 according to the first embodiment.

Figure 12:
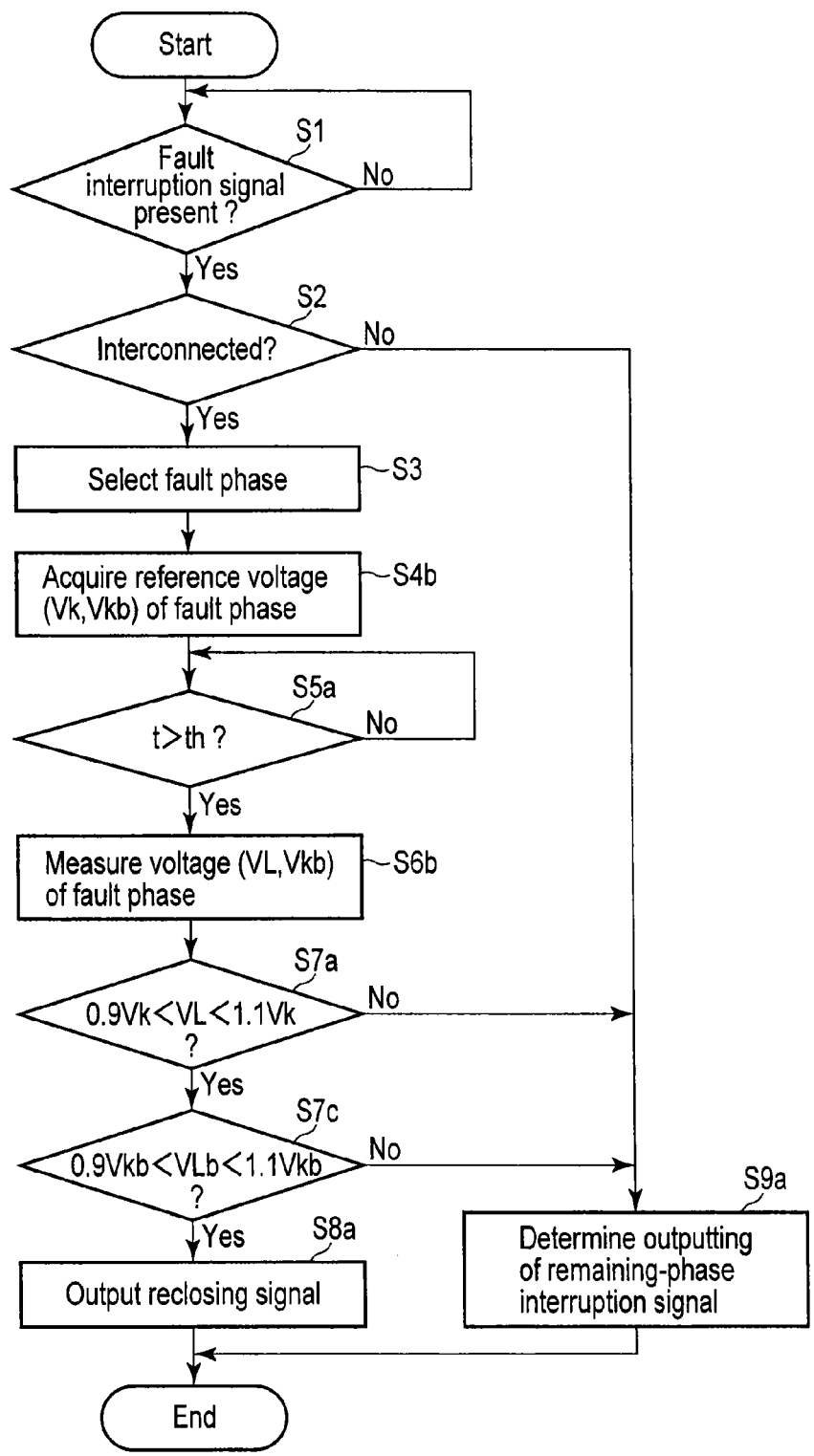
FIG. 12 is a flowchart showing the protection operation of the protection relay apparatus according to the third embodiment.
Figure 15:
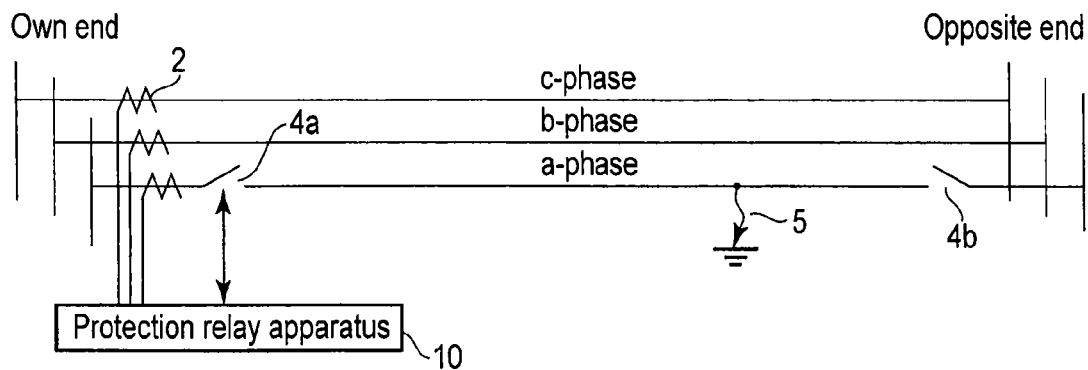
FIG. 15 is a configuration diagram of a two-terminal power system in which the conventional protection relay apparatus is provided.
Figure 16:
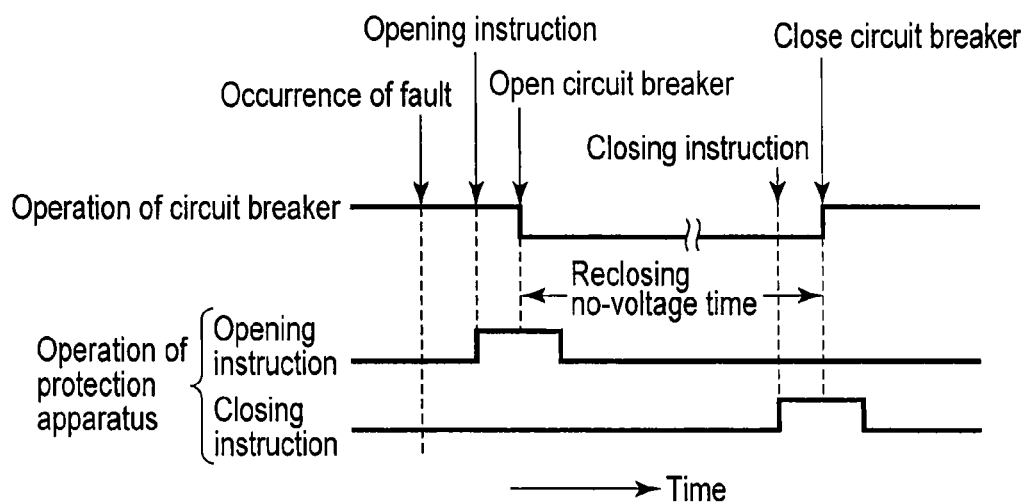
FIG. 16 is a time chart showing the correlation between operation timings of the protection operation of the conventional protection relay apparatus and the opening or closing operation of a circuit breaker.

FIG. 12 is a flowchart showing the procedure of the protection operation of the protection relay apparatus 1B according to the third embodiment.

The flowchart showing the procedure of the protection operation of the protection relay apparatus 1B has the configuration in which step S4a of acquiring a reference voltage is replaced by step S4b, step S6a of measuring a voltage of a fault phase is replaced by step S6b and step S7c of determining an opposite-end interrupted-phase voltage is additionally provided between step S7a and step S8a in the flowchart according to the first embodiment. The other procedure is the same as the flowchart according to the first embodiment.

The procedure of the protection operation of the protection relay apparatus 1B is the same as the first embodiment from step S1 to step S3.

The interrupted-phase voltage determination unit 110 acquires reference voltage Vk of a fault phase selected on its own end side. Further, the opposite-end interrupted-phase voltage determination unit 113 acquires reference voltage Vkb of the fault phase selected on the opposite end side (step S4b).

The interrupted-phase voltage determination unit 110 measures voltage VL of the fault phase on its own end side after an elapse of no-voltage confirmation time th after the fault interruption signal 101 was input. The opposite-end interrupted-phase voltage determination unit 113 acquires voltage VLb of the fault phase on the opposite end side measured after an elapse of no-voltage confirmation time th from the time the fault interruption signal 101 was input (Yes in step S5a, step S6b).

The interrupted-phase voltage determination unit 110 determines whether or not measured voltage VL of the fault phase on its own end side is within the previously set permissible range (0.9Vk<VL<1.1Vk) (step S7a).

The reclosing circuit 100B determines whether or not the remaining-phase interruption signal 109 is to be output (step S9a) when the interrupted-phase voltage determination unit 110 determines that measured voltage VL is not within the permissible range (No in step S7a). The reclosing circuit 100B makes determination by use of the opposite-end interrupted-phase voltage determination unit 113 (step S7c) when the interrupted-phase voltage determination unit 110 determines that measured voltage VL is within the permissible range (Yes in step S7a).

The opposite-end interrupted-phase voltage determination unit 113 determines whether or not acquired voltage VLb of the fault phase on the opposite end side is within a previously set permissible range (0.9Vkb<VL<1.1Vkb) (step S7c).

When the opposite-end interrupted-phase voltage determination unit 113 determines that measured voltage VLb is not within the permissible range (the fault lasts) (No in step S7c), the reclosing circuit 100B determines whether or not the remaining-phase interruption signal 109 is to be output (step S9a). On the other hand, the reclosing circuit 100B outputs the reclosing signal 107 (step S8a) when the opposite-end interrupted-phase voltage determination unit 113 determines that measured voltage VLb is within the permissible range (the fault is recovered) (Yes in step S7c).

That is, the reclosing circuit 100B recloses the circuit breaker 4a provided in the fault phase when the opposite-end interrupted-phase voltage confirmation signal 118 output when it is determined by the opposite-end interrupted-phase voltage determination unit 113 that measured voltage VLb is within the permissible range is input in addition to the interconnection confirmation signal 102 and the interrupted-phase voltage confirmation signal 103.

According to this embodiment, the following operation and effect can be attained in addition to the operation and effect of the first embodiment. Since the protection relay apparatus 1B determines whether or not the fault lasts based on measured voltage VLb on the opposite end side in addition to measured voltage VL on its own end side, the reliability of the result of determination whether or not the fault lasts can be enhanced. As a result, the circuit breaker 4a can be further prevented from being reclosed while the fault lasts.

Further, in this embodiment, the measured voltage detected by voltage transformer 3b provided on the opposite end is received via the transmission line and the operation process for protection (the operation process or the like on the opposite-end interrupted-phase voltage determination unit 113) is performed by the protection relay apparatus 1B on its own end side, but the configuration is not limited to this case. The protection relay apparatus 1B may receive a processing result subjected to the operation process for protection on the protection relay apparatus 1Bb on the opposite end side. For example, the protection relay apparatus 1B may receive a reclosing signal or a remaining-phase interruption signal computed by the protection relay apparatus 1Bb on the opposite end side and use the signals as a condition of opening or closing the circuit breaker 4a.

(Fourth Embodiment)

FIG. 13 is a circuit diagram showing the sequence of a protection operation of a protection relay apparatus 1C according to a fourth embodiment of the invention.

The protection relay apparatus 1C has the configuration in which the reclosing circuit 100 is replaced by a reclosing circuit 100C in the protection relay apparatus 1 according to the first embodiment shown in FIG. 2. The reclosing circuit 100C has the configuration in which a timer 115 and AND gate 116 are added to the reclosing circuit 100 according to the first embodiment to output a low-speed reclosing signal 119. The other portions are the same as those of the protection relay apparatus 1 according to the first embodiment.

A signal (a signal equivalent to the remaining-phase interruption signal 109) from an AND gate 108 is input to the timer 115. No-voltage confirmation time th that is the same as the timer 104 is set in the timer 115. In this case, no-voltage confirmation time th set in the timer 115 may be a time different from the timer 104. The timer 115 outputs a signal to the AND gate 116 after an elapse of no-voltage confirmation time th from the time a signal from the AND gate 108 was input.

A signal from the timer 115, the interconnection confirmation signal 102 and the interrupted-phase voltage confirmation signal 103 are input to the AND gate 116. When all of the signal from the timer 115, the interconnection confirmation signal 102 and the interrupted-phase voltage confirmation signal 103 are input, the AND gate 116 outputs the low-speed reclosing signal 119.

FIG. 14 is a flowchart showing the procedure of the protection operation of the protection relay apparatus 1C according to the fourth embodiment.

The flowchart showing the procedure of the protection operation of the protection relay apparatus 1B has the configuration in which step S9b, step S5b, step S6c, step S7d and step S8b are added in the flowchart according to the first embodiment shown in FIG. 6. In this case, step S5b, step S6c, step S7d and step S8b are steps respectively equivalent to step S5a, step S6a, step S7a and step S8a. The other procedure is the same as that of the flowchart according to the first embodiment. In this case, steps S9b, S5b, S6c, S7d, S8b newly added in the flowchart according to the first embodiment are mainly explained, it is considered that the other steps are the same as those of the first embodiment and the explanation is omitted.

The reclosing circuit 100C determines whether or not the remaining-phase interruption signal 109 is to be output (step S9b) when it is determined by the interrupted-phase voltage determination unit 110 that measured voltage VL is not within the permissible range (No in step S7a).

After determining whether or not the remaining-phase interruption signal 109 is to be output (step S9b), the interrupted-phase voltage determination unit 110 acquires measured voltage VL of the fault phase again by use of the voltage transformer 3 (step S6c) after an elapse of no-voltage confirmation time th from the time a signal from the AND gate 108 was input (Yes in step S5b). The interrupted-phase voltage determination unit 110 determines whether or not re-acquired measured voltage VL is within the previously set permissible range (step S7d).

The reclosing circuit 100C terminates the operation process when re-acquired measured voltage VL of the fault phase is not within the permissible range (No in step S7d). That is, the reclosing circuit 100C does not reclose it and the circuit breaker 4a is kept in an open state. On the other hand, the reclosing circuit 100C outputs the low-speed reclosing signal 119 (step S8b) when it is determined that re-acquired measured voltage VL of the fault phase is within the permissible range. As a result, the circuit breaker 4a is reclosed.

That is, after determining whether or not the remaining-phase interruption signal 109 is to be output (step S9b), the reclosing circuit 100C determines again whether the fault lasts or not. In this case, if it is determined that the fault does not last (the fault is recovered), reclosing (low-speed reclosing) of the circuit breaker 4a is performed.

According to this embodiment, the following operation and effect can be attained in addition to the operation and effect of the first embodiment.

If it is determined that the fault lasts by use of measured voltage VL after an elapse of no-voltage confirmation time th from the time fault interruption occurred, the protection relay apparatus 1C determines again whether the fault lasts or not by use of measured voltage VL acquired after an elapse of no-voltage confirmation time th. As a result, since the opportunity of reclosing the circuit breaker 4a can be increased, the opportunity of solving power failure can be increased.

In each embodiment, the power transmission line protection relay apparatus that protects the power transmission line is explained, but this is not limitative. It may be applied as a bus protection relay apparatus that protects a bus or a transformer protection relay apparatus that protects a transformer or the like.

Further, in each embodiment, the circuit breakers 4a, 4b may not be provided between the current transformers provided on both ends of a line (such as a bus, power transmission line, distribution line or the like).

Moreover, in each embodiment, the protection relay apparatus 1 or the like is explained to mainly perform an opening or closing operation for the circuit breakers 4a on its own end side, but like the circuit breakers 4a on its own end side, the circuit breakers 4b on the opposite end side may be subjected to an opening or closing operation by the protection relay apparatus 1 or the like.

Further, in each embodiment, whether reclosing is performed or not is determined based on measured voltage VL measured by the voltage transformer 3 after a delay time due to the timer 104 in which no-voltage confirmation time th longer than a de-ionization time is set, but this is not limitative. For example, the reclosing circuit 100 or the like may output the reclosing signal 107 when measured voltage VL is measured on the real-time basis and measured voltage VL comes into the previously set permissible range.

Further, in the second embodiment, it is explained with the first embodiment used as the basic configuration, but it may be explained with the third embodiment or fourth embodiment used as the basic configuration. In the fourth embodiment, like the phase of measured voltage VL on its own end side, the phase of measured voltage VLb on the opposite end side may be used for determining whether the fault is recovered or not.

Additionally, in the second embodiment, it is supposed that the phase of reference voltage Vk is obtained by continuously calculating the phase of the power transmission line at the sound time from the time prior to occurrence of the fault with the timer contained in the protection relay apparatus 1A, but this is not limitative. As the phase of reference voltage Vk, a phase of a bus or the phases (remaining phase) other than the fault phase may be used. In this case, since the phases can be measured on the real-time basis, it becomes unnecessary to continuously perform an operation process for the phase from the time prior to occurrence of the fault in the protection relay apparatus 1A.

Further, in the fourth embodiment, closing caused by low-speed reclosing is explained only for the circuit breaker 4a of the fault phase, but the circuit breakers 4a of the remaining phases other than the fault phase opened by the remaining-phase interruption signal 109 may be closed. Further, whether the fault lasts or not is determined by use of measured voltage VL of the fault phase to perform closing caused by low-speed reclosing, but measured voltages of the two phases (remaining phases) other than the fault phase may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A protection relay apparatus that protects lines of a three-phase alternating current power system, the protection relay apparatus comprising:
    a fault detector configured to detect a fault of a line;
    an opening unit configured to open a circuit breaker of a fault phase in which the fault has occurred through detection of the fault by the fault detector;
    a fault phase voltage measurement unit configured to measure a voltage of the fault phase after the circuit breaker is opened by the opening unit;
    a fault recovery determination unit configured to determine whether the fault is recovered or not based on the voltage measured by the fault phase voltage measurement unit; and
    a closing unit configured to close the circuit breaker when the fault recovery determination unit determines that the fault is recovered,
    wherein the fault recovery determination unit determines that the fault is recovered when the voltage measured by the fault phase voltage measurement unit is within a previously set permissible range, and determines that the fault is not recovered when the voltage measured by the fault phase voltage measurement unit is not within a previously set permissible range, after an elapse of a no-voltage confirmation time after the circuit breaker was opened by the opening unit,
    the closing unit suspends a closing of the circuit breaker when the fault recovery determination unit determines that the fault is not recovered, and
    the no-voltage confirmation time is a time that is longer than a time to a time point at which it is predicted that a measured voltage of the fault phase becomes constant in a portion near a reference voltage immediately after completion of interruption of the fault phase.

2. The protection relay apparatus according to claim 1, wherein the fault recovery determination unit determines that the fault is recovered when a phase difference between a phase of the voltage measured by a fault phase voltage measurement unit and a phase of a voltage of the fault phase at a sound time is smaller than a preset phase difference after the elapse of the preset time after the circuit breaker was opened by the opening unit.

3. The protection relay apparatus according to claim 1, further comprising:
    an opposite-side voltage measurement unit configured to measure an opposite-side voltage that is a voltage of a portion opposing a measurement portion of the line via the fault phase voltage measurement unit, and
    wherein the fault recovery determination unit determines whether the fault is recovered or not based on the opposite-side voltage measured by the opposite-side voltage measurement unit.

4. The protection relay apparatus according to claim 1, further comprising:
    a remaining-phase opening unit configured to open the circuit breaker of a phase other than the fault phase when it is determined by the fault recovery determination unit that the fault is not recovered.

5. The protection relay apparatus according to claim 1, further comprising:
    a fault recovery re-determination unit configured to re-determine whether the fault is recovered or not after an elapse of a preset time when it is determined by the fault recovery determination unit that the fault is not recovered; and
    a low-speed closing unit configured to close the circuit breaker of the fault phase when it is determined by the fault recovery re-determination unit that the fault is recovered.

* * * * *